United States Patent
Vronsky et al.

(10) Patent No.: US 8,393,865 B2
(45) Date of Patent: Mar. 12, 2013

(54) ROTOR BLADE EXTENSION PORTION HAVING A SKIN LOCATED OVER A FRAMEWORK

(75) Inventors: Tomas Vronsky, Southampton (GB); Mark Hancock, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 812 days.

(21) Appl. No.: 12/231,611

(22) Filed: Sep. 3, 2008

(65) Prior Publication Data
US 2010/0028162 A1 Feb. 4, 2010

(30) Foreign Application Priority Data
Aug. 1, 2008 (GB) .................................. 0814107.9

(51) Int. Cl.
*B64C 27/615* (2006.01)
*F03D 11/00* (2006.01)
(52) U.S. Cl. .......................... 416/23; 416/232
(58) Field of Classification Search ............... 416/23, 416/230, 232–233
See application file for complete search history.

(56) References Cited

U.S. PATENT DOCUMENTS

| | | | |
|---|---|---|---|
| 4,081,220 A * | 3/1978 | Andrews | 416/226 |
| 4,273,601 A * | 6/1981 | Weingart | 156/189 |
| 4,278,401 A * | 7/1981 | Martinelli | 416/230 |
| 4,316,701 A | 2/1982 | Scarpati et al. | |
| 4,339,230 A * | 7/1982 | Hill | 416/226 |
| 4,412,784 A | 11/1983 | Wackerle et al. | |
| 4,618,313 A | 10/1986 | Mosiewicz | |
| 4,643,646 A | 2/1987 | Hahn et al. | |
| 4,739,846 A | 4/1988 | Minamida et al. | |
| 5,456,579 A * | 10/1995 | Olson | 416/23 |
| 5,474,425 A * | 12/1995 | Lawlor | 416/223 R |
| 5,570,997 A | 11/1996 | Pratt | |
| 7,204,674 B2 | 4/2007 | Wobben | |
| 2002/0105190 A1 | 8/2002 | Thomas | |
| 2004/0105752 A1 | 6/2004 | Wobben | |
| 2007/0025858 A1* | 2/2007 | Driver et al. | 416/229 R |
| 2007/0036653 A1* | 2/2007 | Bak et al. | 416/98 |
| 2008/0206062 A1* | 8/2008 | Sanz Pascual et al. | 416/226 |

(Continued)

FOREIGN PATENT DOCUMENTS

| | | |
|---|---|---|
| DE | 919776 | 2/1963 |
| DE | 199 62 454 | 7/2001 |

(Continued)

OTHER PUBLICATIONS

Chris Vosper; Search Report issued in priority Great Britain Application No. GB0814107.9; Nov. 27, 2008; 1 page; Great Britain Intellectual Property Office.

(Continued)

*Primary Examiner* — Jenny L Wagner
*Assistant Examiner* — Mark Tornow
(74) *Attorney, Agent, or Firm* — Wood, Herron & Evans, LLP

(57) ABSTRACT

A wind turbine rotor blade extension portion having a permanent framework with one or more chord-wise members and a substantially span-wise member. A membrane is located over the framework to thereby generate a streamlined surface. The extension portion is configured to transmit aerodynamic loads from the membrane, along the chord-wise members to a rotor blade to which the extension portion is connected, in use.

21 Claims, 3 Drawing Sheets

U.S. PATENT DOCUMENTS

| | | | |
|---|---|---|---|
| 2009/0068017 A1* | 3/2009 | Rudling | 416/219 R |
| 2009/0140527 A1* | 6/2009 | Pawar et al. | 290/55 |
| 2009/0290982 A1* | 11/2009 | Madsen et al. | 416/61 |
| 2009/0324412 A1* | 12/2009 | Roorda | 416/204 R |
| 2010/0127504 A1* | 5/2010 | Hancock | 290/55 |

FOREIGN PATENT DOCUMENTS

| | | |
|---|---|---|
| DE | 10 2006 022 279 | 11/2007 |
| EP | 0 283 730 B1 | 11/1992 |
| EP | 1 184 566 | 6/2002 |
| EP | 1 524 431 A1 | 4/2005 |
| EP | 1 887 219 A1 | 2/2008 |
| GB | 194805 | 3/1923 |
| GB | 2 311 978 A | 10/1997 |
| WO | 0146582 A2 | 6/2001 |
| WO | WO 02/051730 A2 | 7/2002 |
| WO | WO 02/051730 A3 | 7/2002 |
| WO | WO 2007/071249 A1 | 6/2007 |
| WO | WO 2007/118581 | 10/2007 |
| WO | WO 2008/000330 A3 | 1/2008 |
| WO | WO 2008/086805 | 7/2008 |
| WO | WO 2008/131800 | 11/2008 |

OTHER PUBLICATIONS

Gearoid O'Shea; International Search Report and Written Opinion issued in related PCT Application No. PCT/GB2009/050748; Sep. 17, 2010; 10 pages; European Patent Office.

* cited by examiner

ROTOR BLADE EXTENSION PORTION HAVING A SKIN LOCATED OVER A FRAMEWORK

BACKGROUND OF THE INVENTION

1. Field of the Invention

The present invention relates to the field of rotor blades for wind turbine installations. In particular, it relates to means for extending a chord-wise dimension of a portion of said rotor blades.

2. Description of the Related Art

Wind turbine installations are continuously being developed to enable the installation to capture and subsequently convert an increasing amount of the energy represented by the wind into electricity. In particular, it is desirable to increase the surface area of the blade that is presented to the wind to enable a more efficient capture of said energy. However, in providing a rotor blade having an increased surface area, increased loading is experienced by the structure of the blade.

Blade design involves optimisation of a number of characteristics of the blade. This optimisation typically involves selection of the aerofoil section to be used and variation of the aerofoil section along the span-wise length of the blade, camber of the blade and twist of the blade along a span-wise length. A rotor blade is varied in geometry in the span-wise direction, as the speed of the blade through the air increases with distance from the rotor hub. Furthermore, as the distance from the rotor hub increases, the air becomes "cleaner", in other words, there is less interference from other bodies such as the rotor hub itself and other, adjacent, blades.

In order to achieve optimal design for the blade in a root region of the blade, i.e. a proximal end of the blade, it is desirable to extend the chord-wise dimension to compensate for slower tangential velocity in this region. However an increase in dimension of the blade can cause structural problems.

FIG. 1 shows one type of a conventional rotor blade 2 comprising a load bearing, spar member 4 extending substantially the length of the blade, to which is connected an outer surface 6 of the blade 2. This outer surface is, generally, smoothly configured to enable air (or other fluid) to pass over in a streamlined manner. Rotor blades experience significant structural loading in operation, not only due to the aerodynamic loads exerted thereon but also due to the magnitude and weight of the structure of the rotor blade itself. These loads are primarily transmitted to the spar member 4 and from there to a hub (not shown) of the wind turbine.

In operation, the rotor blades 2 of a wind turbine rotate through a substantially vertically orientated plane. Consequently, significant cyclic loading is experienced by each blade. In particular, fluctuating tensile and compressive loads are experienced along a foremost or "leading" edge 8 of the blade 2 and along a rearmost or "trailing" edge 10 of the blade 2. Hereinafter, these particular loads are referred to as "edge-wise loads". The edge-wise loads are most significant in a root region of the rotor blade 2, for example for the 30% of the blade nearest to a hub of the wind turbine (once installed).

Whilst the edge-wise loads are experienced by both the leading edge 8 and the trailing edge 10, the trailing edge is located further from the neutral axis of the rotor blade 2 and therefore higher strains are experienced at the trailing edge 10 of the rotor blade. Furthermore, by locally increasing the chord-wise dimension in a root region of the rotor blade 2 (as depicted in FIG. 1), the trailing edge 10 describes a convex profile when viewed in plan form. It follows that when edge-wise loads are experienced along this profile, the material bounded by the trailing edge 10 is also exposed to the increased, fluctuating strain. In particular, a difficult to resist chord-wise load is exerted on the material, effectively compressing the trailing edge 10 tending to cause this material to buckle.

In some rotor blades the cross section varies from representing an aerofoil at a region of maximum chord dimension to becoming circular in cross section at a root of the rotor blade. Such a variation means that the curvature described by the trailing edge 10 (when viewed in plan form) is more extreme. As the curvature is more extreme, the fluctuating strains experienced by the material bounded by the trailing edge are correspondingly increased.

It is, therefore, desirable to provide a means for increasing the chord of the blade, in a localised manner to enhance the aerodynamic performance of the rotor blade, whilst minimising a corresponding increase in structural loading.

SUMMARY OF THE INVENTION

According to a first aspect, the present invention provides a wind turbine rotor blade extension portion comprising:

a permanent framework, having one or more chord-wise members and a substantially span-wise member; and a skin located over the framework to thereby generate a streamlined surface, wherein the extension portion comprises a first surface and a second surface, the two surfaces being spaced from one another at a proximal region of the extension portion and connected to one another at a distal region of the extension portion and wherein the extension portion is configured to transmit aerodynamic loads exerted on the skin, along the chord-wise members to a trailing portion of a rotor blade to which the extension portion is connected, in use.

By providing an extension portion having surfaces that comprise a skin, a very efficient, streamlined surface is achieved that avoids significantly increasing the weight of the blade to which the extension portion is connected, in use.

Use of a permanent framework gives strength and stability to the extension portion, a characteristic that is particularly useful when coupled with the skin used to form outer surfaces of the extension portion.

If a rotor blade to which the extension portion is connected experiences extreme loading, for example stationary hurricane loading, the framework and skin of the extension portion have some potential to deflect. In extreme conditions, the extension portion may become detached from the rotor blade. It follows that the rotor blade is consequently depowered and, therefore, experiences reduced loading under these extreme environmental conditions. Consequently, potential damage to the rotor blade can be minimised.

The chord-wise members of the permanent framework may be connected to the substantially span-wise member at a trailing edge of the extension portion. The frame may comprise fibre reinforced polymer (FRP), wood or a metal such as aluminium. The frame may have a substantially rectangular cross section or may be substantially circular in cross section. The members of the framework may be manufactured using pultrusion techniques or they may be filament wound.

The skin (e.g. a stretchable membrane) may, preferably, be stretched over the framework and may comprise polyester or nylon or may comprise a fibre reinforced polymer such as glass fibre reinforced polymer (GFRP), Kevlar® and/or carbon fibre reinforced polymer (CFRP).

The members of the framework may be bonded to the skin directly. Alternatively, pockets may be formed in the skin, these pockets being configured to receive the structural members of the framework.

A connection member may be provided between the first surface and the second surface to control the separation of the first surface from the second surface. The, or each, connection member may comprise one or more cables, a membrane web, through thickness struts. The connection member may be connected to the skin of the first surface and the skin of the second surface. Alternatively, the connection member may be connected to the chord-wise members that support the first surface and/or the second surface.

A leading edge of the first surface and/or a leading edge of the second surface may be provided with a, or respective, further span-wise members. The, or each, further span-wise member may be bonded to respective leading edges or, alternatively, they may be received by pockets formed in respective leading edges of the skin of the first and/or second surfaces. The, or each, chord-wise member may be connected to respective further span-wise members.

According to a second aspect, the present invention provides a wind turbine rotor blade, comprising:
 a structurally coherent, blade portion comprising:
  a leading portion configured to receive wind incident on the rotor blade; and
  a trailing portion, located downstream of the leading portion and configured to smoothly convey fluid passing thereover from the leading portion, wherein a root region of the blade portion is configured to be connectable to a hub of a wind turbine and the blade portion is configured to smoothly transfer loads experienced thereby to the root region of the blade portion for transfer to the hub; and
 an extension portion, as previously described, wherein the extension portion is configured to be appendable to the trailing portion of the blade portion, e.g. in a root region thereof.

By providing a rotor blade, having a separate blade portion and extension portion, many advantages can be achieved:
 Structural loads acting along a trailing edge of the rotor blade, in use, are shifted closer to the neutral axis of the rotor blade, thus reducing a lever arm over which such forces act.
 Transportation of the rotor blade becomes easier as the extension portion and the blade portion can be separately transported to an installation site. Costs of transportation are generally reduced if the maximum width of the rotor blade is reduced.
 Design of the rotor blade can be optimised for particular site locations by changing only the extension portion; this enhances the flexibility of a given product.
 The particularly light weight configuration of the extension portion reduces the mass of the rotor blade, further reducing costs.
 It also follows that lower gravitational loads are experienced at the hub of a wind turbine installation to which the rotor blade may be attached in use.
 The blade portion of the rotor blade is substantially narrower than a conventional rotor blade enabling a primary shell mould used in manufacture of the blade to be correspondingly narrower. Consequently, the mould takes up less room and in particular smaller ovens are required for curing the blade.
 Damaged extension portions can readily be replaced.

The blade portion may comprise a truncated profile, whereby the root region of the trailing portion is configured to receive the extension portion. In this way, the blade portion can be designed to have a reduced weight and a substantially straightened structural rearmost edge.

Alternatively, the blade portion may be a full wind turbine rotor blade. The addition of an extension portion to such a rotor blade enables an increase in local chord length to be achieved.

According to a third aspect, the present invention provides a wind turbine installation comprising a rotor hub supported by a tower, wherein one or more of the aforementioned rotor blades are appended to the rotor hub.

According to a fourth aspect, the present invention provides a wind turbine rotor blade extension portion comprising:
 a permanent framework, having one or more chord-wise members and a substantially span-wise member; and
 a membrane located over the framework to thereby generate a streamlined surface, wherein the extension portion is configured to transmit aerodynamic loads from the membrane, along the chord-wise members to a trailing portion of a rotor blade to which the extension portion is connected, in use.

Buckling represents one of the primary modes of failure of a conventional rigid skin of a turbine blade and buckling is avoided when a membrane is used, as the compressive loads are not sustained.

By "structurally coherent" we mean that the associated component, here the blade portion of the rotor blade, provides an effectively unitary member which efficiently transmits structural loads from an outboard region of the blade portion to the hub. In this way, any loading experienced from the outboard region of the blade portion accumulates along the length of the blade and is readily transmitted to the hub of the installation.

By "permanent framework" we mean permanent in situ/in operation.

By "streamlined surface" we mean a smoothly varying, continuous surface over which the associated fluid flow passes smoothly with little or no disruption in the streamlines of said fluid flow.

BRIEF DESCRIPTION OF THE DRAWINGS

In the drawings:
The present invention will now be described in more detail, by way of example only, with reference to the accompanying drawings in which.

DETAILED DESCRIPTION OF THE PRESENTLY PREFERRED EMBODIMENTS

Figure 1:
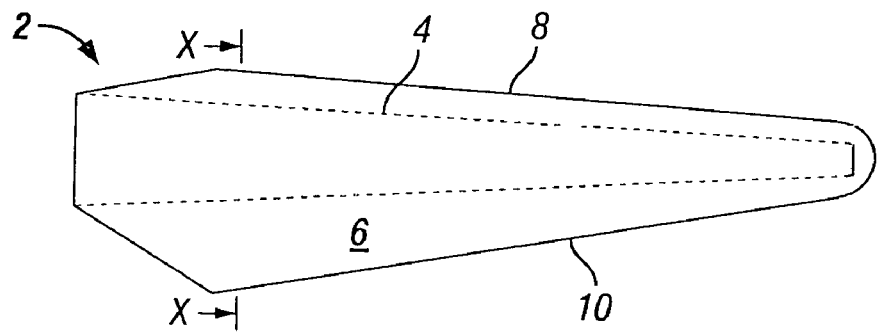
FIG. 1 represents a prior art rotor blade having a span-wise variation in chord length.
Figure 2:
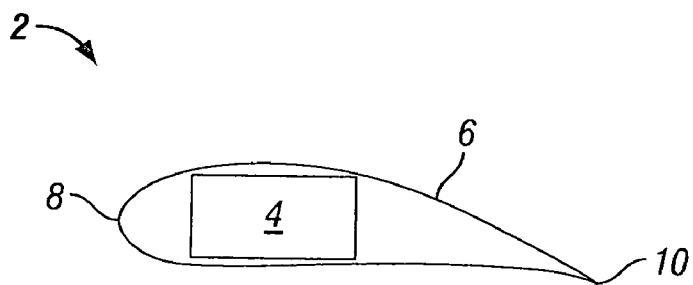
FIG. 2 represents a cross section (on X-X) of the rotor blade of FIG. 1.
Figure 3:
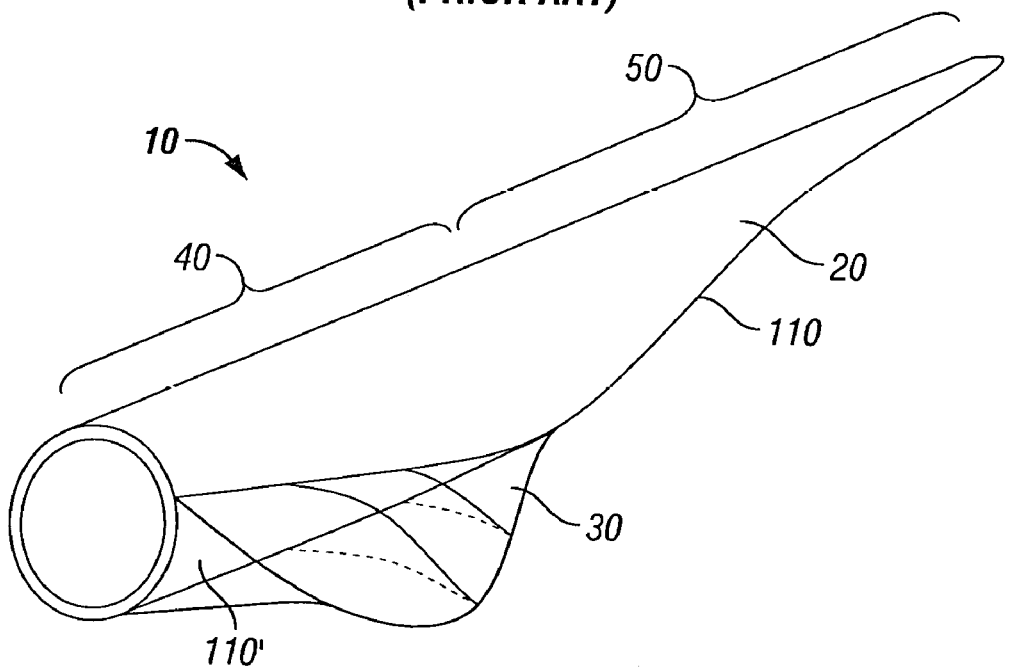
FIG. 3 illustrates a schematic of a rotor blade having an extension portion appended thereto.

FIG. 3 illustrates a rotor blade 10 comprising a blade portion 20 and an extension portion 30. A proximal or "root" end 40 of the blade portion 20 is configured to be connected to a rotor hub of a wind turbine installation (not shown), while the distal end 50 of the blade portion 20 extends from the root end 40, and is supported thereby in a cantilevered manner. This distal end 50 represents a "tip" of the blade 10. The length of a rotor blade 10 may be in the range of 20 to 150 meters in length but is typically in the range of 20 to 70 meters. An extension portion 30 is appended to a rearmost region of the root end 40. In the illustrated embodiment the extension portion 30 is appended at an extreme proximal location, adjacent to where the rotor blade is connected to the rotor hub in use, however, the extension portion 30 may be spaced from this extreme proximal location towards the tip of the blade.

Figure 4:
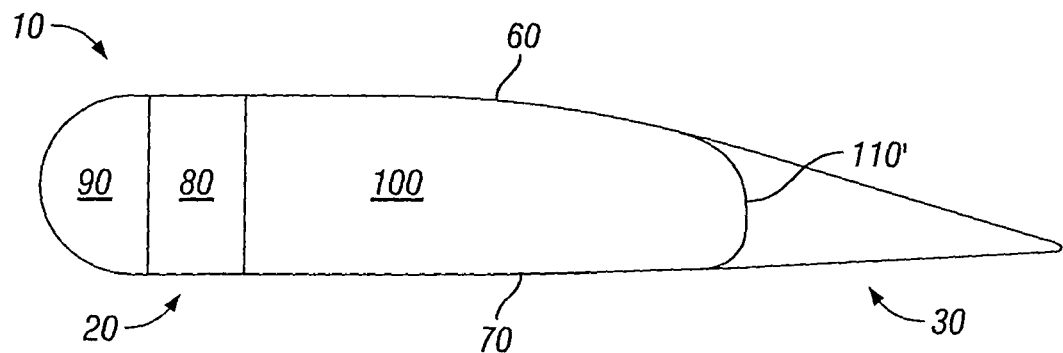
FIG. 4 illustrates a schematic cross section of a rotor blade.

A schematic representing a cross section of the root end 40 of the rotor blade 10 is shown in FIG. 4. An upper surface (as depicted in the figure) represents a suction side 60 of the blade portion 20 and a lower surface (as depicted in the figure) represents a pressure side 70 of the blade portion 20. A representative structure of the blade portion 20 is also indicated. A load bearing spar member 80 is shown, having a leading portion 90 located upstream thereof and a trailing portion 100 located downstream thereof.

The blade portion 20 of the rotor blade 10 may be made up from a plurality of sub-components. However, the sub-components are connected to one another in such a way that structural loading is readily transmitted between one sub-component and any sub-components adjacent thereto. In this way, a unitary member is effectively provided, such that structural coherence is achieved.

The blade portion 20 of rotor blade 10 may represent an existing design of a rotor blade or, alternatively, it may represent a specifically designed blade. FIG. 4 represents the latter example, a trailing portion 100 of the specifically designed blade has a truncated profile at the root end 40, thus presenting a rearmost surface 110' to which the extension portion 30 may be appended.

The blade portion 20 of rotor blade 10 may be manufactured by separately forming a longitudinally extending, structural spar 80 together with two half-shells. A first half-shell provides the suction surface 60 of the blade 10 and a second half-shell provides the pressure surface 70 of the blade 10. The spar and the two half-shell components are assembled and bonded together to form a cohesive unit. In such an example, the primary loading experienced by the rotor blade 10 is borne by the spar 80.

Figure 5:
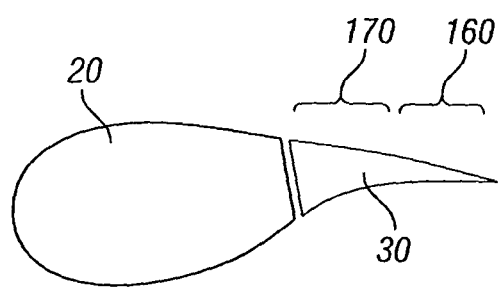
FIG. 5 illustrates a schematic cross section of another rotor blade.

In an alternative example, each half-shell component is, itself, reinforced and the separate spar of the previous example is replaced by longitudinal webs that are bonded to each respective half-shell as the blade portion 20 of the rotor blade 10 is assembled. Alternatively, the webs may be omitted, in which case, the loading is carried by the reinforced shell as illustrated in FIG. 5. The spar is then, effectively, integral with the rotor blade 10 and the cohesive unit bears any loading in a more distributed manner.

In normal use, once assembled in a wind turbine installation, the root end 40 of the rotor blade 10 travels slower than the tip end 50 and, consequently, the fluid travelling thereover is correspondingly slower. In order to achieve the preferred aerodynamic loading pattern on the rotor blade 10, it is desirable to increase the chord length of the blade 10 at the root end 40. Accordingly, as illustrated in FIG. 3, an extension portion 30 is appended to the rearmost surface 110', extending from a rear-most edge 110 of the trailing portion 100 of the blade portion 20, at the root end 40 thereof. The extension portion 30 provides a continuation of the suction surface 60 of the blade portion 20 of the rotor blade 10 and the corresponding pressure surface 70 of the blade portion 20 of the rotor blade 10. The continuation of these surfaces 60, 70 allows the flow pattern, established on the main portion 20 of the rotor blade 10, to be extended.

Figure 6:
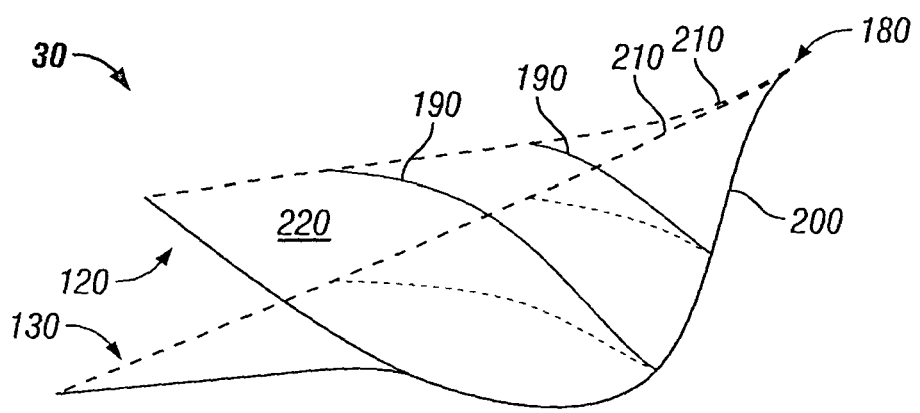
FIG. 6 illustrates a rotor blade extension portion.

The extension portion 30 is illustrated in more detail in FIG. 6. The extension portion 30 comprises a first surface 120 and a second surface 130. The first surface 120 is connected to the second surface 130 in a distal region 160 of the extension portion 30. The surfaces 120, 130 are separated from one another in a proximal region 170 of the extension portion 30. Each of the respective surfaces 120, 130 are formed from a light weight skin or membrane material in order to minimise the contribution of the extension portion 30 to the overall weight of the rotor blades 10 and hence to edge-wise loads that are experienced thereby. Example membrane materials include, but are not limited to, polyester, nylon, polymeric materials, fibre reinforced polymers e.g. GFRP, para-aramid (aromatic polyamide) fibre reinforced polymer, CFRP.

The skin/membrane material is selected such that it exhibits a low tensile stiffness which inhibits transmission of loads. For example, such a material could transmit less than 10% of the load that would be transmitted by a conventional, rigid turbine rotor skin.

The extension portion 30 comprises a framework 180 to support the surfaces 120, 130. The framework 180 comprises a number of chord-wise members 190, in this example two are provided and are spaced from one another in a span-wise sense as illustrated. The span-wise distribution of the chord-wise members 190 is maintained by attaching each chord-wise member 190 to a substantially longitudinally extending, or "span-wise" member 200, such that a framework 180 is achieved.

Further span-wise members 210 may be incorporated as indicated (in dashed lines) on FIG. 6. Span-wise members 210 may be particularly useful if the extension portion 30 is to be pre-assembled and transported separately to the blade portion 20. Example materials from which the framework 180 may be made include wood, metal e.g. aluminium, fibre reinforced polymer (FRP). The framework members 190, 200, 210 may be comprise pulltruded, filament wound tubes or machined. The members 190, 200, 210 have a substantially rectangular or substantially circular cross section and may be hollow or solid.

In this embodiment, a flaccid membrane 220 is stretched over the framework 180, ideally this membrane 220 should be held under tension.

The membrane may simply lie over the framework and be connected to the blade portion 20 directly. Alternatively, the membrane 220 may be bonded to the framework 180 such that relative movement between the membrane 220 and the framework members 190, 200 is inhibited.

In a further embodiment, pockets are formed within the membrane 220 to receive the framework members 190. In this way, relative movement between the members 190 and the membrane 220 is permitted but minimised. In such a configuration, the members of the framework 180 need not be connected to one another directly but, rather, the relative positioning of the structural members of the framework 180 is defined by the location of the pockets formed in the membrane 220.

Figure 7:
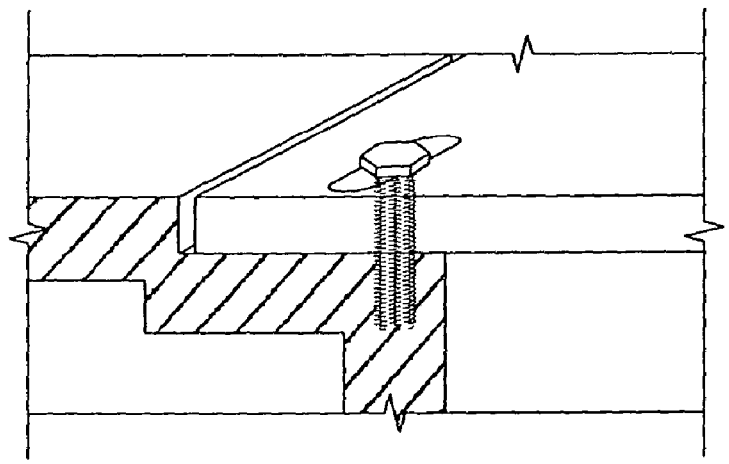
FIG. 7 illustrates an interface between an extension portion and a blade portion.

The extension portion 30 is connected to the blade portion 20 in use. In one embodiment, respective leading edges of the membrane describing the first surface 120 and the second surface 130 may be bonded directly to a trailing portion of the blade portion 20. Such a bond may be continuous preventing relative motion therebetween or, alternatively, may comprise a discretised bond having separate points of attachment along the span-wise direction. These points of attachment may be provided by bonding material or, alternatively, may be provided by bolts. As illustrated in FIG. 7 the bolt may be received with a longitudinally extending recess which, therefore, permits some degree of span-wise movement, say 1 mm to 10 mm.

Figure 8:
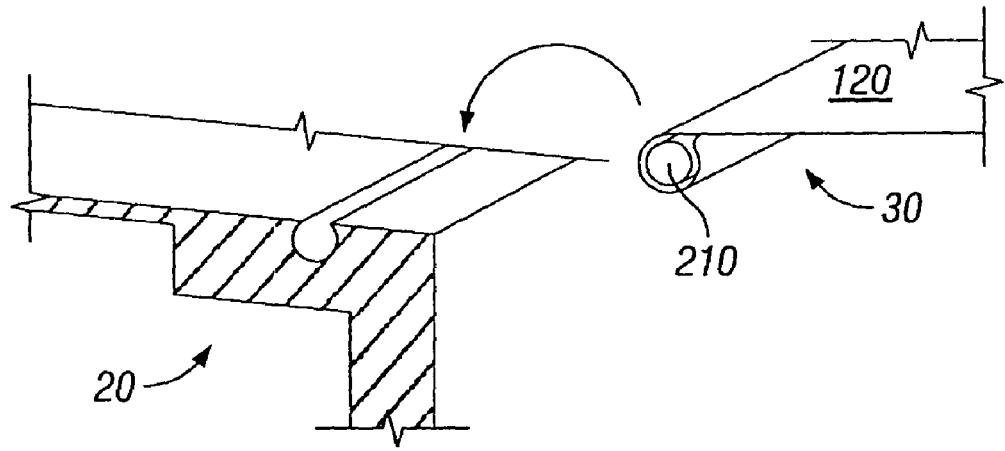
FIG. 8 illustrates an alternative interface between an extension portion and a blade portion.

A pocket may be formed along the respective leading edges of membrane 220 of the first and second surfaces 120, 130 and span-wise members 210 may be provided within these pockets as illustrated in FIG. 8. A cooperating recess may be provided on a trailing portion of blade portion 20 as illustrated in FIG. 8 and the span-wise member 210 may be slid into this recess to secure extension portion 30 in place relative to the blade portion 20. As shown, the extension portion 30 is connected to and supported by the blade portion 20 in a cantilevered configuration.

Web members 140 may be provided between the first surface 120 and the second surface 130 and connected thereto in order to restrict relative movement between first surface 120 and second surface 130. Such web members 140 may be provided by shaped cloth or cables, each held in tension. Additionally, tension cables may be provided between a rearmost surface 110' of the trailing portion 100 of the blade portion 20 and a trailing edge of the extension portion 30 described by the substantially span-wise member 200 of the extension portion 30. Such tension cables help to retain the overall shape of the extension portion 30.

Framework 180 uses the stiffness of its own members 190, 200, 210 coupled with compressive loads in some members, reacted by tensile loads in other members to achieve rigidity from a light weight structure.

In operation, the rotor blade 10 is exposed to a moving air stream. The interaction between the air stream and the rotor blade 10 causes loads to be exerted on the blade and the blade is consequently displaced. As the rotor blade 10 rotates around the hub, the loads experienced thereby constantly change as the aspect of the blade 10 differs depending on its location at any point in time. In particular, edgewise loads are induced in each lateral edge of the blade portion, these edgewise loads are generated primarily by the action of the weight of the rotor blade 10.

As fluid passes over the blade 10 primary load paths are retained within the blade portion 20 of the blade 10. Introduction of the extension portion 30 enables the blade portion 20 to retain a more constant chord. Consequently, the rearmost edge 110 of the blade portion 20 is significantly straighter than is the case when an extension portion 30 is not used. By straightening the rearmost edge, chord-wise loading caused by directing loads around an extreme trailing edge of a rotor blade 10 is reduced and structural loading of the blade portion 20 is enhanced.

Introduction of the extension portion 30 at a rearmost portion of the blade portion 20 serves to enhance the fluid flow over the rotor blade 10 at the root end 40 such that an optimum amount of lift, i.e. efficient loading of the rotor blade 10, is achieved in this root region 40. Aerodynamic loads exerted on the extension portion 30 are transmitted to the blade portion 20 through the connection means, but transmission of loads to the extension portion 30 are inhibited.

Indeed, loading of the extension portion 30 is notably light when transmission of the edgewise loads is inhibited (if not prevented) from the surface 110', 110 of the blade portion 20 to the extension portion 30. Consequently, significant increases in chord-wise length can be introduced at the root end 40 of the rotor blade 10 without incurring significant loading in this area and without requiring the remainder of the rotor blade 10 to be significantly reinforced to accommodate additional loading.

The invention has been described with reference to specific examples and embodiments. However, it should be understood that the invention is not limited to the particular examples disclosed herein but may be designed and altered within the scope of the invention in accordance with the claims.

What is claimed is:

1. A wind turbine rotor blade extension portion, comprising:
    a permanent framework, having one or more chord-wise members and a substantially span-wise member;
    a skin located over the framework to thereby generate a streamlined surface, wherein the extension portion comprises a first surface and a second surface, the first and second surfaces being spaced from one another at a proximal region of the extension portion and connected to one another at a distal region of the extension portion, wherein the extension portion is configured to transmit aerodynamic loads exerted on the skin, along the chord-wise members to a trailing portion of a rotor blade to which the extension portion is connected, in use, and wherein the substantially span-wise member is positioned at the distal region where the first and second surfaces are connected to each other; and
    a further span-wise member, located at one of a leading edge of the first surface and a leading edge of the second surface.

2. The extension portion according to claim 1, wherein the skin is a stretchable membrane.

3. The extension portion according to claim 1, wherein the chord-wise members of the permanent framework are connected to the substantially span-wise member at a trailing edge of the extension portion.

4. The extension portion according to claim 1, wherein the members of the framework comprise one of the group of fibre reinforced polymer, wood and metal.

5. The extension portion according to claim 1, wherein the skin comprises a fibre reinforced polymer.

6. The extension portion according to claim 5, wherein the fibre reinforced polymer is one of the group of glass fibre reinforced polymer (GFRP), para-aramid (aromatic polyamide) fibre reinforced polymer and carbon fibre reinforced polymer (CFRP).

7. The extension portion according to claim 1, wherein the members of the framework are bonded to the skin.

8. The extension portion according to claim 1, wherein the skin comprises a pocket configured to receive a member of the framework.

9. The extension portion according to claim 1, wherein a connection member is provided between the first surface and the second surface to control the separation of the first surface from the second surface.

10. The extension portion according to claim 9, wherein the connection member comprises one of the group of a cable, a membrane web and a strut.

11. The extension portion according to claim 10, wherein the connection member is connected to the skin at the first surface and the skin at the second surface.

12. The extension portion according to claim 10, wherein the connection member is connected between chord-wise members that respectively support the first surface and the second surface.

13. The extension portion according to claim 1, wherein the, or each, further span-wise member is bonded to the, or each, respective leading edge.

14. The extension portion according to claim 1, wherein the, or each, further span-wise member is received by a pocket formed in a leading edge of the skin of one of the first and second surfaces.

15. The extension portion according to claim 1, wherein the skin is a flaccid membrane stretched over the framework.

16. The extension portion according to claim 15, wherein the flaccid membrane is held under tension.

17. A wind turbine rotor blade, comprising:
a structurally coherent blade portion, comprising:
a leading portion configured to receive wind incident on the rotor blade; and
a trailing portion, located downstream of the leading portion and configured to smoothly convey fluid passing thereover from the leading portion, wherein a root region of the blade portion is configured to be connectable to a hub of a wind turbine and the blade portion is configured to smoothly transfer loads experienced thereby to the root region of the blade portion for transfer to the hub; and
an extension portion configured to be appendable to a root region of the trailing portion of the blade portion, comprising:
a permanent framework, having one or more chord-wise members and a substantially span-wise member;
a skin located over the framework to thereby generate a streamlined surface, wherein the extension portion comprises a first surface and a second surface, the first and second surfaces being spaced from one another at a proximal region of the extension portion and connected to one another at a distal region of the extension portion, wherein the extension portion is configured to transmit aerodynamic loads exerted on the skin, along the chord-wise members to a trailing portion of a rotor blade to which the extension portion is connected, in use, and wherein the substantially span-wise member is positioned at the distal region where the first and second surfaces are connected to each other; and
a further span-wise member, located at one of a leading edge of the first surface and a leading edge of the second surface.

18. The rotor blade according to claim 17, wherein the extension portion is appended to a root region of the trailing portion.

19. The rotor blade according to claim 18, wherein the blade portion comprises a truncated profile, whereby the root region of the trailing portion of the blade portion is configured to receive the extension portion.

20. The rotor blade according to claim 17, wherein the blade portion is a wind turbine rotor blade.

21. A wind turbine installation comprising a rotor hub supported by a tower, the installation comprising a rotor blade according to claim 17, appended to the rotor hub.

* * * * *